United States Patent [19]

Segal et al.

[11] 4,255,556

[45] Mar. 10, 1981

[54] PREPARATION OF POLY(ESTER CARBONATE) BY INTERFACIAL METHOD

[75] Inventors: Leon Segal, Randolph; Bruce T. DeBona, Madison, both of N.J.

[73] Assignee: Allied Chemical Corporation, Morris Township Morris County, N.J.

[21] Appl. No.: 29,422

[22] Filed: Apr. 12, 1979

[51] Int. Cl.³ ............................................. C08G 63/64
[52] U.S. Cl. ................................... 528/190; 528/126; 528/128; 528/173; 528/176; 528/179; 528/191; 528/193; 528/194; 528/370; 528/371; 528/372
[58] Field of Search ............... 528/173, 176, 179, 190, 528/191, 193, 194, 370, 371, 372, 128, 126

[56] References Cited

U.S. PATENT DOCUMENTS

| | | | |
|---|---|---|---|
| 3,028,364 | 4/1962 | Conix et al. | 5/176 |
| 3,028,365 | 4/1962 | Schnell et al. | 528/196 |
| 3,030,331 | 4/1962 | Goldberg | 528/176 |
| 3,169,121 | 2/1965 | Goldberg | 528/193 |
| 3,646,102 | 2/1972 | Kobayashi et al. | 260/463 |
| 3,989,672 | 11/1976 | Vestergard | 528/196 |
| 4,137,218 | 1/1979 | Prevorsek et al. | 528/126 |
| 4,156,069 | 5/1979 | Prevorsek et al. | 528/176 |

OTHER PUBLICATIONS

*Interfacial Polycondensation*, P. W. Morgan, SPE Journal, Jun. 1959, pp. 485–495.
*Interfacial Polycondensation*, W. M. Eareckson, J. Pol. Sci., (1959), pp. 399–406.
*Mixed Polyesters of Carbonic and Terephthalic Acids*, Kolesnikov et al., *Vysokomol. Soyed*, A9: No. 5, (1967), pp. 1012–1015.
*Study of Polyestercarbonates Based on Diane, Phosgene and the Dichloride of Terephthalic Acid*, *Vysokomol. Soyed*, A9, No. 7 (1967), pp. 1520–1524, Kolesnikov et al.
*The Synthesis and Properties of Mixed Polyesters from Phosgene, Terephthalyl Dichloride and 2,2-di(3-methyl-4-hydroxyphenyl) propane*, Kolesnikov et al., *Vysokomol, Soyed*, A10, No. 1, (1968), pp. 145–151.

*Primary Examiner*—Lester L. Lee
*Attorney, Agent, or Firm*—Alan M. Doernberg; Robert A. Harman

[57] ABSTRACT

Poly(ester carbonate) polymers are prepared by reaction of bifunctional phenolates in an aqueous phase with phosgene and with the acyl halide of a bifunctional carboxylic acid halide such as terephthaloyl chloride in an organic solvent such as dichloromethane. At least a portion of the phosgene is reacted with the phenolate before or during reaction of the acid chloride with the phenolate to avoid the formation of polyester blocks which have limited solubility in the organic solvent. After reaction is complete, or at any stage wherein oligomers are formed, the aqueous phase can be cleanly removed and easily separated from the organic phase, and the organic phase readily washed free of by-products. The final polymer product is recovered from the washed organic phase and is colorless, substantially amorphous and melt processable, and has a high glass transition temperature.

13 Claims, No Drawings

PREPARATION OF POLY(ESTER CARBONATE) BY INTERFACIAL METHOD

BACKGROUND OF THE INVENTION

The present invention relates to the production of poly(ester carbonate) polymers by a two phase reaction system.

Polycarbonates are conventionally prepared from a difunctional phenol such as 2,2-bis(4-hydroxyphenyl)propane (commonly referred to as bisphenol-A) and phosgene by either a solution process or an interfacial process. Briefly the solution process involves reacting phosgene with the difunctional phenol in a single organic phase employing a compatible solvent such as dichloromethane and having a base such as pyridine to accept by-product hydrogen chloride. Such a solution process is described, for example, in U.S. Pat. No. 3,028,365 to Schnell et al. (Apr. 3, 1962). In the interfacial process, the difunctional phenol is introduced as a diphenolate, particularly of an alkali hydroxide (represented by the disodium phenolate of bisphenol-A) in an aqueous phase and mixed with the phosgene (neat or in an organic solvent such as dichloromethane) to form an emulsion. A phase transfer catalyst (that is an acid acceptor) such as triethylamine may be used to accept the by-product hydrogen chloride from the condensation in the organic phase and to transfer the hydrogen chloride to the basic aqueous phase where it is neutralized and the catalyst is regenerated in its basic form to accept additional hydrogen chloride. Alternatively other types of catalysts such as quaternary ammonium salts such as chlorides may be used. Additionally, chain length regulators such as t-butylphenol may be employed to limit the molecular weight and thus the viscosity of the polymer. Examples of such a process are described in U.S. Pat. No. 3,646,102 to Kobayashi et al. (Feb. 29, 1972) and in P. W. Morgan, Condensation Polymers: By Interfacial and Solution Methods (Interscience 1965). Similar interfacial processes for the formation of polyesters from bisphenol-A and acyl halides such as terephthaloyl chloride or isophthaloyl chloride are described by W. M. Eareckson in J. Polymer Science, Vol. 40, pp. 399–406 (1959) and in Morgan, pp. 325–93. Other suitable bifunctional phenols for such polyesters are described in British Pat. No. 897,640 to Imperial Chemical Industries Limited (May 30, 1962) and Morgan, pp 334–337. Other suitable acyl chlorides are described, for example, in U.S. Pat. No. 3,028,364 to Conix et al. (April 1962), U.S. Pat. No. 4,137,218 to Prevorsek et al. (Jan. 30, 1979) and in Morgan, pp 334–337.

A class of polymers has been developed from polyfunctional phenols such as bisphenol A, polyfunctional carboxylic acids or preferably their acyl halides and phosgene. These polymers are referred to as poly(ester carbonate) polymers and are broadly described, for example, in U.S. Pat. No. 3,169,121 to Goldberg (Feb. 9, 1965) and more especially disclosed in German Patent Application DOS No. 2,714,544 (published Oct. 2, 1977) (which corresponds to pending U.S. Patent Application Ser. No. 764,623 of Prevorsek et al., filed Feb. 1, 1977), now U.S. Pat. No. 4,156,069. Also pertinent are three articles by Kolesnikov et al. published in Vysokomol. Soyed. as, respectively, A9: No. 5, pp. 1012–1015 (1967) A9; No. 7, pp. 1520–1524 (1967); and A10: No. 1, pp. 145–151 (1968). In general, the above published German Patent Application describes poly(ester carbonate) polymers having a desirable combination of melt processibility, high glass transition temperature, high molecular weight as indicated by specific viscosities in the general range of 0.5 to 1 as measured in solvents such as methylene chloride or tetrachloroethane and high Izod impact resistance. By contrast, the poly(ester carbonate) polymers disclosed in the Kolesnikov et al. articles are generally of lower glass transition temperature and lower specific viscosity rendering them unsuitable for many of the intended uses, especially as tough, impact resistant plastic articles. The particular poly(ester carbonates) from terephthalic acid prepared following the Examples of the Goldberg patent, and particularly Example 5, had been determined experimentally, when molded into standard test specimens, to have relatively poor values for melt stability, glass transition temperature, impact strength and haze as compared to the products of the Prevorsek et al. U.S. Pat. No. 4,156,069 and corresponding DOS No. 2,714,544.

Interfacial processes for producing polyesters and polycarbonates offer significant advantages over solution processes including lower cost of neutralization of byproduct acid halide, faster reaction and elimination of noxious organic bases. It would be desirable to be able to prepare poly(ester carbonate) polymers of the type described in the above referenced published German Patent Application by an interfacial process. The Kolesnikov et al. articles employ such an interfacial process, but without achieving the desired combination of properties. Similarly, as indicated in Comparative Example 3 herein, the teachings of U.S. Pat. No. 3,646,102 to Kobayashi et al. can be combined with the teachings of published German Patent Application No. 2,714,544. One would form short polyester oligomers as in DOS No. 2,714,544 and then add phosgene as in DOS No. 2,714,544, but would perform both steps in an interfacial process with very high agitation as in U.S. Pat. No. 3,646,102. A process combining these two references in this manner produces poly(ester carbonate) polymers inferior to the polymers of the published German Patent Application. Because of the difficulty of phase separation of the aqueous and organic phases inherently present in an interfacial polymerization, these polymers have poor color, haze values, glass transition temperatures and other poor properties. It is expected that, under conditions in which the product quality is even moderately good, the yields are likely to be low, because poor phase separation leads to difficulties in washing, isolating and recovering the polymer.

Accordingly it is an object of the present invention to produce poly(ester carbonate) polymers having the combination of properties described in German Patent Application No. 2,714,544, including all of the above features, by interfacial process in good yields.

BRIEF DESCRIPTION OF THE INVENTION

The present invention includes an interfacial process of producing a substantially amorphous, melt processible poly(ester carbonate) which comprises:

(1) mixing with an aqueous bisphenolate solution having a pH of at least about 8, (a) phosgene and (b) an organic solution of an acid halide which solution is immiscible with the aqueous bisphenolate solution, at a temperature and for a sufficient time and under sufficient agitation to react said phosgene and said acid halide with said bisphenolate and form an amorphous polymer;

said aqueous bisphenolate being an alkali metal or alkaline earth metal salt of at least one bisphenol of the formula I:

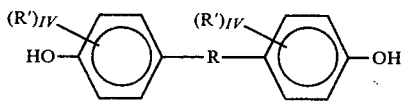

where R is alkylene of 1-4 carbons, —O—, —S—, —SO$_2$—, —CO— or a single bond, and R' is independently at each occurence, H, Cl, Br, F, alkyl, phenyl or halogenated alkyl; said acid halide being at least one compound of the formula II, III or IV

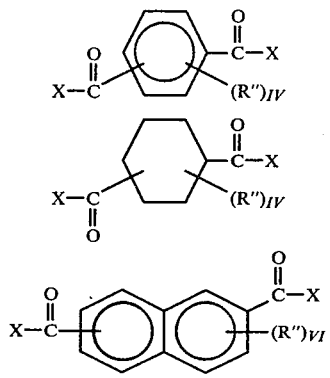

with X being Cl or Br, the acid halides being meta or para or 2,6 or 2,7 and R" being independently at each occurrence, H, Cl, Br, F, alkyl, phenyl or halogenated alkyl, the overall molar ratio of phosgene to acid halide being between about 0.2:1 and about 20:1; the molar ratio of bisphenolate to acid halide plus phosgene being between about 1.0:1.0 and about 1.0:1.2; and at least about 20% of phosgene as a molar percentage of the acid halide being mixed with the aqueous bisphenolate no later than the mixing of the acid halide with the bisphenolate;

(2) separating the aqueous phase from the organic phase containing the amorphous polymer;

(3) washing the organic phase with an aqueous liquid; and (4) recovering the substantially amorphous, melt processable poly(ester carbonate) polymer from the washed organic phase.

By employing the conditions described above for the reacting step, the formation of polyester blocks is avoided such that the organic phase containing either the final polymer or oligomers formed during the reaction can be easily separated from the aqueous phase and washed with aqueous liquid without a substantial loss of yield. Furthermore, the polymer can be formed with the desired viscosity evidencing long average chain length. Accordingly, when the polymer is precipitated from the organic phase, it can have the desired combination of properties including high glass transition temperature, melt processability and substantially amorphous condition. Furthermore, no insoluble sludge is formed and fewer washings are required to clean up the polymer.

If the conditions described above are not followed, the resultant polymerization mixture is present as a single-phase, "oil-in-water" or "water-in-oil" emulsion, which is extremely stable and does not appear to be separable by standard methods usable in production without precipitating the polymer. The polymer phase is thereby resistant to purification and isolation unless tedious, costly and/or numerous operations are employed.

DETAILED DESCRIPTION OF THE INVENTION

The present invention relates to an interfacial process having an aqueous phase and an organic phase. The aqueous phase is normally basic to the extent of a pH of at least about 8 and preferably at least about 9 prior to reaction. During reaction, the pH may vary within the range of about 7-12, but preferably is kept above 7 by the addition of base such as sodium hydroxide when needed.

The organic phase may be based upon any conventional organic solvent for the product polymer and for oligomers formed during the reaction. One preferred group of solvents are the chlorinated aliphatic hydrocarbons of 1-4 carbons such as methyl chloride, dichloromethane, chloroform, carbon tetrachloride, dichloroethane, trichloroethane, trichloroethylene, tetrachloroethylene and mixtures thereof. Another preferred group of solvents are the chlorinated and non-halogenated aromatic hydrocarbons such as toluene, monochlorobenzene, dichlorobenzene and mixtures thereof. Preferred solvent are the chloromethanes and especially dichloromethane. The solvent should be "immiscible" with the washing liquid by which is meant soluble to an extent less than 10%, preferably less than 6%. Since the aqueous bisphenolate phase used in the reaction mixture is normally higher in ionic materials than the aqueous washing liquid, the organic solvent is usually also substantially immiscible in the aqueous bisphenolate phase.

The quantity of organic solvent and the concentration of reactants in the solvent are not critical except that sufficient solvent should be present to dissolve the product polymer. Enough dichloromethane to form a product polymer solution of about 20 weight percent polymer formed from phosgene, bisphenol-A and terephthaloyl chloride is generally the minimum amount of solvent for this particular system.

Other materials, such as chain length regulators, catalysts, foam depressants and the like can also be present in the organic phase.

The reactant provided in the aqueous phase is referred to herein as a "bisphenolate". This reactant is normally formed by dissolving a bisphenol of the above formula I in water with an inorganic base, and especially in an aqueous or alkaline earth metal hydroxide, preferably an alkali metal hydroxide, and more preferably sodium hydroxide. In the above formula I, R' is preferably H such that each phenol is substituted only by hydroxyl and by the linking group R. R in turn is preferably alkylene of 1-4 carbons and especially isopropylidene. It will be appreciated that when R' is H and R is isopropylidene, the bisphenol is bisphenol-A. Thus the most preferred bisphenolate is the disodium salt of bisphenol-A.

The concentration of bisphenolate in the aqueous phase is not critical to the present invention, with concentrations up to the solubility limits of the bisphenol being preferred, but excess amounts (forming a slurry) being less preferred. A representative range for bisphenol-A is about 2-15%, preferably about 3-10%. Other materials may be present in the aqueous phase in addition to the bisphenolate and excess base such as anti-oxidants, foam depressants, catalysts and chain length regulators.

The acid halide employed in the present invention is preferably of the above formula II such that the acid halide groups are in the 1,3(meta) or 1,4(para) position. Preferably R" is H in all occurrences such that the acid halide is either isophthaloyl chloride, isophthaloyl bromide, terephthaloyl chloride, terephthaloyl bromide or mixtures thereof. Also preferably X is chloride, such that the most preferred acid halides are terephthaloyl chloride, isophthaloyl chloride and mixtures thereof.

The acid halide may also be of the above formula III with the acid halide groups in the meta or para position. Preferably R" is H in all occurrences such that the acid halide is 1,4-cyclohexanedicarboxylic acid chloride, 1,4-cyclohexanedicarboxylic acid bromide, 1,3-cyclohexanedicarboxylic acid chloride or 1,3-cyclohexanedicarboxylic acid bromide or mixtures thereof. The preferred acid halide of this group is 1,4-cyclohexanedicarboxylic acid chloride.

The acid halide may also be of the above formula IV with the acid halide groups being 2,6 or 2,7. Preferably R" is H in all occurrences such that the acid halide is 2,6-naphthalenedicarboxylic acid chloride or bromide or 2,7-naphthalenedicarboxylic acid chloride or bromide or mixtures thereof. The preferred acid halide of this group is 2,6-naphthalenedicarboxylic acid chloride.

Acid chlorides derived from benzophenone as described in U.S. Pat. No. 4,137,218 may also be used, but are not believed to cause the problems described herein when blocks of polyester derived from terephthalic acid chloride or the like form and the process requirements of the present invention are not followed.

In terms of the overall bisphenolate, acid halide and phosgene provided to the reaction, the molar ratio of phosgene to acid halide may be between about 0.2:1 and about 20:1. The best properties are achieved when the phosgene to acid halide ratio is between about 0.7:1 and about 1.2:1, preferably 0.8:1 to 1.2:1 and especially about 1:1. In the preferred cases, the product will have the same overall composition as the poly(ester carbonate) polymers prepared by the solution processes described in U.S. Pat. No. 4,156,069 and published German Application No. 2,714,544. Another group of desirable poly(ester carbonate) polymers are those prepared with a low proportion of acid chloride relative to phosgene such as are described in pending U.S. Patent application Ser. No. 965,119 of Prevorsek et al., filed Nov. 30, 1978.

The overall ratio of bisphenolate to acid halide plus phosgene in the present invention is between about 1:1 and about 1.0:1.2, preferably between about 1:1.01 and about 1:1.1 such as about 1:1.05. These ratios are designed so that the phosgene and acid chloride are always either in excess or in an equivalent of molar amounts to the bisphenol. It is believed that during mixing of the aqueous phase with the organic phase, some hydrolysis of phosgene to carbon dioxide and some hydrolysis of the diacid chloride to either the corresponding monoacid, monoacid chloride or the corresponding diacid occurs. So long as the acid chloride and phosgene are provided in excess, high molecular weights can be achieved with a resultant equimolar amount of phosgene and acid halide incorporated to bisphenol incorporated, with any excess of phosgene lost to hydrolysis or elsewhere. By contrast, if the bisphenol is in excess, oligomers terminated in hydroxyl will form and not react to higher molecular weights, at least in a reasonable time.

It should be appreciated that hydrolysis of chloroformate generally result in the liberation of carbon dioxide with free phenolic hydroxyl left on the oligomer. By contrast, hydrolysis of a terminal acid chloride results in the formation of a terminal carboxyl group, which is generally inert to further reaction under the conditions of the interfacial process. Such hydrolysis reactions are typified by the following:

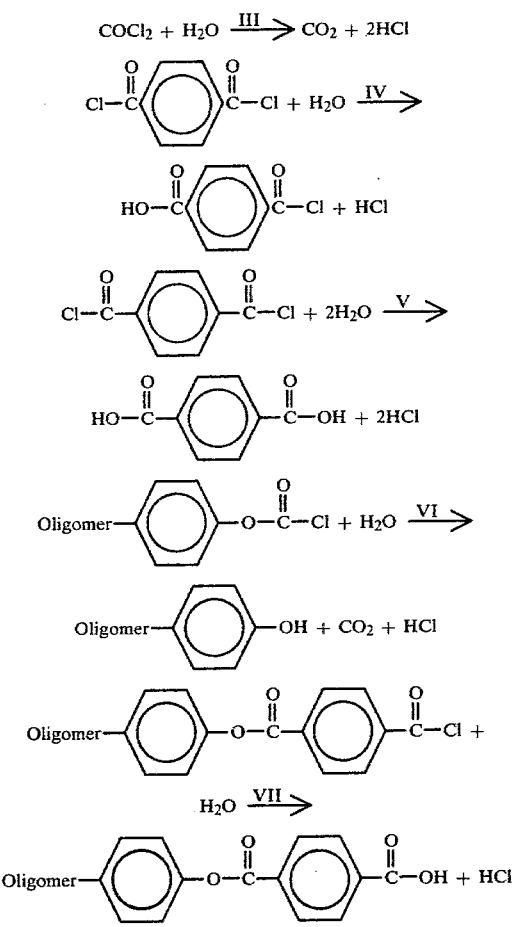

Thus it will be appreciated that hydrolysis of phosgene (reaction III) or chloroformate terminated oilgomer (reaction VI) causes only a net loss of phosgene monomer with the carbon dioxide released having no adverse effect on the reaction. Hydrolysis of terephthaloyl chloride (reactions IV and V) causes formation of acid groups which may interfere in the reaction and, in the case of the monoacid (reaction IV) act as a chain terminating monomer. Hydrolysis of an acid chloride terminated oligomer (reaction VII) forms carboxy terminated oligomers which are generally resistant to further reaction.

While it is not intended that the present invention be tied to any particular theory, it can be speculated that the formation of terminal carboxyl groups may account in part for the low specific viscosities obtained by Kolesnikov et al. when the molar ratio of phosgene to terephthaloyl chloride was 50:50 or less.

A critical feature of the present invention is that at least a significant portion of the phosgene be mixed with the aqueous bisphenolate no later than the mixing of the acid halide with the bisphenolate. For example, at least about 20% of the phosgene and even all of the phosgene may be mixed with the acid halide in the organic phase prior to mixing the organic phase with the aqueous phase. Alternatively part of the phosgene may be reacted with large excesses of the aqueous bisphenolate to form small carbonate oligomers in the organic phase with the acid chloride and the remainder of the phosgene then mixed with the aqueous phase and the oligomers to form the final polymers. A third alternative is to dissolve part of the phosgene in the organic phase with the acid chloride, mix and react all of the aqueous phase with this organic phase under conditions that would form primarily phenolic hydroxyl terminated oligomers and then add the remaining phosgene to link these oligomers into the final polymer. Still other combinations of steps are contemplated so long as a portion of the phosgene, such as at least about 20% of the phosgene as a molar percentage of the acid halide, are mixed and reacted with the aqueous bisphenolate no later than the mixing of the acid halide with the bisphenolate.

The amount of phosgene that must be mixed with the aqueous bisphenolate before or during mixing of the acid halide with the bisphenolate can vary depending upon reaction conditions and especially the particular acid chloride, particular bisphenol and particular solvent employed. At least about 20% and preferably at least about 50% of phosgene as a molar percentage of the acid halide is so mixed before or during mixing of the acid halide with the aqueous bisphenolate. In some preferred modes, all of the phosgene can be mixed simultaneously with the organic acid halide phase and the aqueous bisphenolate phase, or it can be premixed into the organic phase.

In experiments similar to Example 2, below, but with only about 10% of phosgene (by moles of terephthalic chloride) added with the terephthalic chloride, an emulsion formed which did not separate cleanly even after repeated dilutions, washes and acidifications. Thus, about 10% phosgene added with the acid chloride is generally insufficient to avoid the problems noted in Comparative Example 3, below.

The conditions of the mixing are generally sufficient to cause a high degree of mixing such that the liquid becomes opaque in appearance without separate phases clearly discernible by visual observation. The temperature is not critical with room temperature being suitable.

While the mixing rate during reaction has not been found critical to achieving a reaction mixture that can be cleanly separated into organic and aqueous phase without undue treatment, a preferred range of agitation does achieve separation by merely allowing the reaction mixture to stand after reaction. This preferred range appears to be about 500–1000 r/m for the solvents, reactants, concentrations, reactor configuration and other conditions described in the Examples, but will of course differ depending upon variations in such conditions. Even when operating outside this preferred range, the emulsion that forms and does not separate can still be separated into aqueous and organic phases without undue difficulty. Most commonly vigorous agitation and then allowing the liquid to stand will cause clean phase separation. Other techniques that may help achieve clean phase separation are acidification, especially with an acid soluble in the organic phase, and dilution with either organic solvent or water. This unstable emulsion is not unlike the unstable emulsion described at page 111 of P. L. Morgan, Condensation Polymers: By Interfacial and Solution Methods (1965). By contrast, the stable emulsions formed in Comparative Example 3 and in the experiment described above using abut 10% phosgene initially would not be expected from this reference.

In copending application Ser. No. 6,947 of J. T. Baker et al., filed Jan. 25, 1979, results are described of solution processes in which dihydric phenol, diacid chloride and phosgene are reacted in one phase in various series of steps. According to that application, when the bisphenol is added to the acid chloride, 10–50% of the phosgene stoichiometrically required for formation of the desired poly(ester carbonate) should be present, with a tendency towards haziness of the final poly(ester carbonate) polymer if either too little or too much phosgene is present. This application also recommends that most but not all of the remaining phosgene be fed concurrently with the bisphenol. The remaining phosgene should be added after the bisphenol. These criteria would seem to indicate that, in a solution process, phosgene reacts with the bisphenol at a faster rate than the acid chloride such that, unless the phosgene is introduced at least partially after the bisphenol is reacted with the acid chloride, excessively long polycarbonate segments or blocks will form initially and, once the phosgene is exhausted, subsequent reaction will result in the formation of polyester blocks. These polyester blocks result in higher haze values and more color in the final polymer.

By contrast, as shown in the examples herein, in the interfacial process there is apparently no substantial difference in the rate of reaction of phosgene with the bisphenolate to form carbonate and the reaction of the acid chloride with the bisphenolate to form polyester. It is possible, for example, to include all of the phosgene in the organic phase with the acid chloride prior to mixing with the aqueous bisphenolate and still get amorphous polymers with good properties indicative of the absence of long polyester or polycarbonate chains. It will be appreciated that a poly(ester carbonate) polymer having very long polycarbonate blocks or segments and very long polyester blocks or segments will be somewhat crystalline rather than completely amorphous. As used herein, the term "substantially amorphous" is intended to mean at most 10% crystallinity, by weight, as measured by X-ray diffraction as described in Alexander, X-Ray Diffraction Methods In Polymer Science, pp. 137–188 (J. Wiley & Sons 1969). The poly(ester carbonate) polymers produced by Kolesnikov et al. were apparently more crystalline. These polymers would also cause difficulties during phase separation if that was attempted rather than simply precipitating the entire polymer as was described in these articles.

EXAMPLE 1

0.10 moles of bisphenol-A (22.8 g) were dissolved in a solution of 0.2 moles of sodium hydroxide in 146 g water under a nitrogen atmosphere in a flask equipped with a Tru-bore stirrer. 0.03 g (0.045 mL) of triethylamine was added to this aqueous BPA solution.

0.05 moles of terephthaloyl chloride (10.15 g) was dissolved in 163 g (123 mL) of dichloromethane. This TPC/DCM solution was filtered until clear through a 5 micron sintered glass filter to remove terephthalic acid.

Phosgene (gas) was bubbled into 123 mL of dichloromethane at 23° C. The phosgene was not measured, but only a small portion of the stoichiometric requirement (0.05 mol or 4.95 g) was absorbed in this phosgene/DCM solution. The phosgene/DCM solution was then mixed with the TPC/DCM solution to give a phosgene-TPC/DCM solution. 0.0012 mole (0.180 g) of 4-tert-butylphenol was dissolved in 20 mL of dichloromethane to form a TBP/DCM solution having 1.2 mole % of TBP based on moles of BPA.

Simultaneously the phosgene-TPC/DCM solution and the TBP/DCM solution were added to the flask containing aqueous BPA solution with stirring at 300–500 r/min which was sufficient to cause a high degree of turbulence. After twenty minutes of continued stirring the pH was measured as about 11 and additional phosgene gas was bubbled into the mixture. The viscosity and opacity of the mixture was observed to increase slightly.

After 15 minutes of additional stirring the pH was measured as about 6–8. 1.6–2.4 g of sodium hydroxide dissolved in 20–30 mL water were then added, with stirring continuing for an additional 15 minutes, whereupon stirring was stopped.

Within 3–5 minutes after stirring was stopped the reaction mixture separated cleanly into an aqueous phase, which was removed, and an organic phase. The organic phase was washed 15–20 times with 300–500 mL of fresh water each time until a silver nitrate test for chloride ion in the wash water gave a negative result. Each time, the water and organic phases separated cleanly with no inter-phase sludge (soluble in neither phase) or semi-solids observed.

The organic phase was then filtered through a fine porosity sintered glass disc yielding a crystal clear, colorless filtrate which was charged to a one gallon Waring blender containing 1200–1500 mL of acetone under rapid and vigorous agitation, precipitating polymer as a fine flake. The liquid was decanted off and the polymer dried at 120° C. in a vacuum oven. The resultant polymer has a specific viscosity in phenol/tetrachloroethane (60:40) of 1.27. The glass transition temperature of the polymer was 188° C. as determined by differential scanning calorimetry. Based upon an infrared spectrum taken using pure polyester and pure polycarbonate as standards, the molar ratio of carbonate to ester ($CO_3/CO_2$) was estimated to be 0.40.

EXAMPLE 2

A glass flask was charged with 0.10 mole (22.8 g) bisphenol A dissolved under nitrogen in 8 g sodium hydroxide in 146 mL water. 0.03 g (0.045 mL) triethylamine was added.

0.05 mole (10.15 g) terephthaloyl chloride was dissolved in 123 mL of dichloromethane and filtered. This TPC/DCM solution was cooled to below 0° C. 0.05 mole (4.75 g) of phosgene was condensed at −78° C. using an acetone/dry ice condenser and dissolved in 123 mL of dichloromethane, with the resultant phosgene/DCM solution kept at −78° C. The TPC/DCM and phosgene/DCM solution were mixed to form a phosgene-TPC/DCM solution at −40 to −50° C. 0.180 g of 4-tertbutylphenol was dissolved in 15 mL of dichloromethane.

The phosgene-TPC/DCM solution and the 4-tert-butylphenol solution were simultaneously charged to the flask containing the aqueous BPA solution with rapid (over 300 r/min) stirring. The flask was immersed in a water bath at 23° C. and the temperature of the reaction mixture rose to 20° C. within 2 minutes of charging the two organic solutions. 15 minutes after charging the organic solutions, the pH was measured as about 14, so that no additional phosgene or base was added, but instead stirring was stopped.

At first no clean separation of phases occurred, but upon addition of 400 mL water and shaking in a separatory funnel, rapid separation into two clearly divided phases occurred. The aqueous layer was discarded and the organic layer was repeatedly washed with water until the wash water gave a negative chloride test. Polymer was then precipitated from the organic phase as in Example 1. The specific viscosity of the polymer was 1.30, the calculated $CO_3/CO_2$ ratio based on its infrared spectrum was 0.45 and the glass transition temperature was 193° C.

A portion of this polymer was molded into a one inch diameter and ⅛ inch thick disc using a compression molding press at 96.5 Pa pressure and 310° C. The resultant discs had a 17.1 yellowness index, a 8.2% "haze" value and an 86% transmission of visible light as determined by ASTM D1003.

Comparative Example 3

An aqueous solution was made up under nitrogen of 620 mL water, 24 g (0.6 mole) sodium hydroxide, 2.8 mL (0.02 mole) triethylamine, 0.3 g sodium hydrosulfite (an antioxidant) and 45.65 g (0.2 mole) bisphenol A.

A TPC/DCM solution was mixed using 20.30 g (0.1 mole) filtered terephthaloyl chloride and 284 mL dichloromethane. A TBP/DCM solution was mixed using 0.45 g (0.003 mole) 4-tert-butylphenol and 50 mL dichloromethane.

The TPC/DCM solution and the TBP/DCM solution were charged over five seconds to the aqueous solution in a flask under agitation of 400 r/min. The initial temperature was 16° C. Reaction appeared to be complete after 5 minutes. Phosgene was then added to the vapor space of the flask at a rate of 0.1 mol/min and, after 30 minutes the pH was 7. Phosgene was cut off, and 0.3 mole sodium hydroxide in 50 mL water was added. The pH was now 12. Stirring was continued for an additional 30 minutes and then stopped. No phase separation occurred.

100 mL of DCM were added, but still no phase separation occurred. 400 mL water and 100 mL more DCM were added, but still no phase separation occurred. 10% aqueous hydrochloric acid containing 5 mL acetic acid was added to a pH of 2 but no phase separation occurred. 800 mL water and 600 mL DCM and 300 mL acetone were added, whereupon two separate phases formed with an intermediate sludge layer. After removing the aqueous layer (but leaving the sludge layer), the organic layer was washed three times with 1000 mL water containing 100 mL acetone. The pH of the last water layer and the washed organic layer was about 5.

The organic layer and sludge (together about 1400 mL) were added to about 9 L of acetone in a battery jar with a double propeller stirrer, baffle and cover. A fine white powder was recovered by filtration and washed with acetone and dried on the funnel. It was then washed with hot water (80° C.) for one hour, filtered and dried in the funnel and finally in a vacuum oven at 120° C. for 12 hours.

The product had a specific viscosity of 0.62 and a glass transition temperature of 175° C. It was stable to 320° C. but lost weight rapidly above 400° C. Based on infrared analysis, it had a ratio of bisphenol to terephthaloyl residues of about 2:1.

A disc 3.1 cm diameter and 0.3175 cm thick was molded from this polymer at 320° C. under a 96.5 MPa pressure to give a very opaque white material. When another disc was molded at 350° C. and 90 MPa, most of the opacity was gone and the color was still good. Polyester blocks melt at the higher temperature; this test is therefore an indirect test for the presence of polyester blocks.

Polymer prepared from this polymer redissolved in DCM, filtered and reprecipitated with acetone (about 15 g) had a specific viscosity of 0.65 dL/g. When this polymer was molded at 315°–320° C., less haze was observed compared to the first disc but the discs were yellow. The filtration removes insoluble polymer such as those containing large polyester blocks.

When the reprecipitated polymer was redissolved in a 5 weight % solution of DCM in water, precipitated with acetone, dried and remolded at 320° C. for 6 minutes, the color was gone and the haze was lower.

Other polymers prepared by interfacial processes in which the TPC had been reacted with the aqueous bisphenolate before adding phosgene also resulted in poor phase separation and low glass transition temperatures compared to the values indicated in Examples 1 and 2. These products had generally poor color, generally poor haze values and in most cases poor thermal stability.

What is claimed is:

1. An interfacial process of producing a substantially amorphous, melt processable poly(ester carbonate) which comprises:
   (1) mixing with an aqueous bisphenolate solution having a pH of at least about 8, (a) phosgene and (b) an organic solution of an acid halide which solution is immiscible with the aqueous bisphenolate solution,
   at a temperature and for a sufficient time and under sufficient agitation to react said phosgene and said acid halide with said bisphenolate to form an amorphous polymer,
   said aqueous bisphenolate being an alkali metal or alkaline earth metal salt of at least one bisphenol of the formula

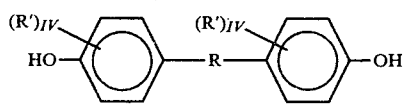

where R is alkylene of 1–4 carbons, —O—, —S—, —SO₂—, —CO— or a single bond, and R' is independently at each occurrence, H, Cl, Br, F, alkyl, phenyl or halogenated alkyl; said acid halide being at least one compound of the formula

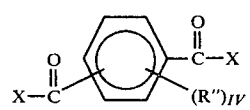

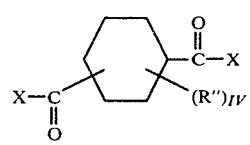

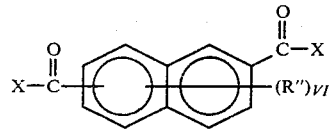

with X being Cl or Br, the acid halides being meta or para or 2,6 or 2,7 and R" being independently at each occurrence, H, Cl, Br, F, alkyl, phenyl or halogenated alkyl;
   the overall molar ratio of phosgene to acid halide being between about 0.2:1 and about 20:1;
   the molar ratio of bisphenolate to acid halide plus phosgene being between about 1:1 and about 1.0:1.2; and
   at least about 20% of phosgene as a mole percentage of the acid halide being mixed with the aqueous bisphenolate no later than the mixing of the acid halide with the bisphenolate;
   (2) separating the aqueous phase and the organic phase;
   (3) washing the organic phase with aqueous liquid; and
   (4) recovering the substantially amorphous, melt processable poly(ester carbonate) polymer from the washed organic phase.

2. The interfacial process of claim 1 wherein the bisphenolate is an alkali metal salt of a bisphenol of the first above formula where R' is H in all occurrences and R is alkylene of 1–4 carbons.

3. The interfacial process of claim 1 wherein the bisphenolate is the sodium salt of 2,2-bis(4-hydroxyphenyl) propane.

4. The interfacial process of claim 1 wherein said acid halide is selected from the group consisting of terephthalolyl chloride, isophthaloyl chloride and mixtures thereof.

5. The interfacial process of claim 4 wherein said acid halide is terephthaloyl chloride.

6. The interfacial process of claim 1 wherein said acid halide is selected from the group consisting of 1,4- and 1,3-cyclohexanedicarboxylic acid bromides and chlorides and mixtures thereof.

7. The interfacial process of claim 1 wherein said acid halide is selected from the group consisting of 2,6- and 2,7-napthalenedicarboxylic acid chloride and bromide and mixtures thereof.

8. The interfacial process of claim 1 wherein at least about 50% of phosgene as a molar percentage of the acid halide is mixed with the aqueous bisphenolate no later than the mixing of the acid halide with the bisphenolate.

9. The interfacial process of claim 1, 3 or 5 wherein all of said phosgene is dissolved with said acid halide in an organic solvent prior to mixing the organic phase with said aqueous bisphenolate.

10. The interfacial process of claim 9 wherein the molar ratio of phosgene to acid halide is between about 0.7:1 and about 1.2:1.

11. The interfacial process of claim 1 wherein the molar ratio of phosgene to acid halide is between about 0.7:1 and about 1.2:1.

12. The method of claim 1 wherein the agitation is sufficient to cause the reaction mixture to become opaque in appearance without separate phases clearly discernible by visual observation.

13. The method of claim 1 wherein the agitation is sufficient to achieve clean phase separation by merely allowing the reaction mixture to stand after reaction.

* * * * *